United States Patent [19]
Palfery et al.

[11] Patent Number: 4,574,463
[45] Date of Patent: Mar. 11, 1986

[54] ADJUSTABLE TORQUE DRIVING TOOL FOR AUTOMATED MACHINING CENTERS

[75] Inventors: Kenneth J. Palfery, Toronto; John S. Malcolm, Schomberg; Angel Kocev, Toronto; Kenrick B. Maharaj, Brampton, all of Canada

[73] Assignee: McDonnell Douglas Corporation, Long Beach, Calif.

[21] Appl. No.: 681,792

[22] Filed: Dec. 14, 1984

[51] Int. Cl.$^4$ ............................................. B23Q 3/157
[52] U.S. Cl. .................................................... 29/568
[58] Field of Search ......................... 29/568, 26 A, 563; 414/758, 763, 729, 738, 783; 901/6, 41; 409/219, 233, 241; 408/139, 140; 192/54, 55

[56] References Cited
U.S. PATENT DOCUMENTS
4,090,287  5/1978  Selander ................................. 29/568
4,348,623  9/1982  Kobayashi et al. ................. 901/6 X FOREIGN PATENT DOCUMENTS
112753  8/1980  Japan ..................................... 29/568

Primary Examiner—William R. Briggs
Attorney, Agent, or Firm—Benjamin Hudson, Jr.; George W. Finch; John P. Scholl

[57] ABSTRACT

There is provided by this invention an adjustable torque driving tool for use with an automated machine tool wherein the adjustable torque driving tool is comprised of a releasable clutch that releases the tool from the rotating spindle of the automated machine tool when a pre-selected torque is applied. The adjustable torque driving tool gives the automated machine tool the capability to bolt workpieces to the worktable prior to machining and unbolting the workpiece from the worktable after machining.

3 Claims, 3 Drawing Figures

4,574,463

ADJUSTABLE TORQUE DRIVING TOOL FOR AUTOMATED MACHINING CENTERS

CROSS-REFERENCE TO RELATED APPLICATIONS

This application is related to the co-pending U.S. application Ser. No. 06/681,802.

BACKGROUND OF THE INVENTION

1. Field of the Invention

This invention relates generally to tools stored in an automated machining center that are selectively retrieved to machine a workpiece and more particularly to an automated machining center having an adjustable torque driving tool that is disposed to be driven at a fixed rate of speed by the automated machining center and is comprised of a clutch means to release the adjustable torque driving tool from being driven when a preselected torque is applied.

2. Description of the Prior Art

Automated machining centers are well-known in the art, that perform a variety of cutting functions such as milling, drilling, threading, tapping, etc. on a workpiece. These machines are normally provided with a tool carrousel that has numerous cutting tools mounted thereon for performing the variety of functions of the machine tool. The tool holder is generally a rotatable tool spindle supported in a drill head adjustably mounted on a vertical column or quill for vertical movement thereon.

The tool spindle is mounted for rotation relative to the quill and is moveable axially with respect to the drill head. Additionally, the workpiece is secured to a worktable that is moveable in an x-y horizontal plane for providing a variety of positions to perform the various cutting operations.

The machining operation is performed by the rotatable tool spindle rotatably mounted in a spindle head and arranged to be shifted vertically with respect to the workpiece. Precision cutting is performed, such that a hole center may be precisely located with respect to the axis of the rotatable tool spindle and the combined movement of the work table in its horizontal plane of movement. During the machining operation, the spindle is rotated at a pre-selected cutting speed and is fed downwardly by the drill head on the quill at a predetermined feed rate. The cutting tool is removably mounted in a chuck which is carried by the lower end of the rotatable tool spindle, and which forms a part thereof. Additionally, a tool changer is adapted to remove the used tool from the chuck at the end of a cutting operation and replace the used tool with a pre-selected new tool in an automatic manner that eliminates lost time associated with manual tool changing operations.

All of these machine functions are carried out in rapid, efficient manner in order to bring about the most efficient operation of the machine tool. The automatic control of the machine tool is provided by a numerical control system operating under the control of a punched tape or other memory device which regulates the table so as to locate a cutting center with respect to the axis of the tool, the automatic selection of the spindle speed, the spindle feed rate on the quill, and other machining functions.

For normal machining operation, it is necessary to adequately secure the workpiece to the moveable work table. This normally requires manually securing the workpiece prior to initial machining and detachment of the workpiece after machining. It would be desirable if an automated machine tool had the capability to secure the workpiece to the moveable worktable without human intervention in a continuous machining cycle and detach the workpiece from the worktable after machining.

SUMMARY OF THE INVENTION

There is provided by this invention an adjustable torque driving tool designed to be used with conventional automated machine tools. This adjustable torque driving tool can be stored and retrieved by the automatic machine tool changer to be used in the rotatable spindle. It is comprised of a clutch means such that the tool can be released from the rotatable spindle at a predetermined torque. This allows the adjustably torque driving tool to be used to bolt a workpiece to the moveable worktable by rotation of the rotatable spindle.

BRIEF DESCRIPTION OF THE PREFERRED EMBODIMENT

Figure 1:
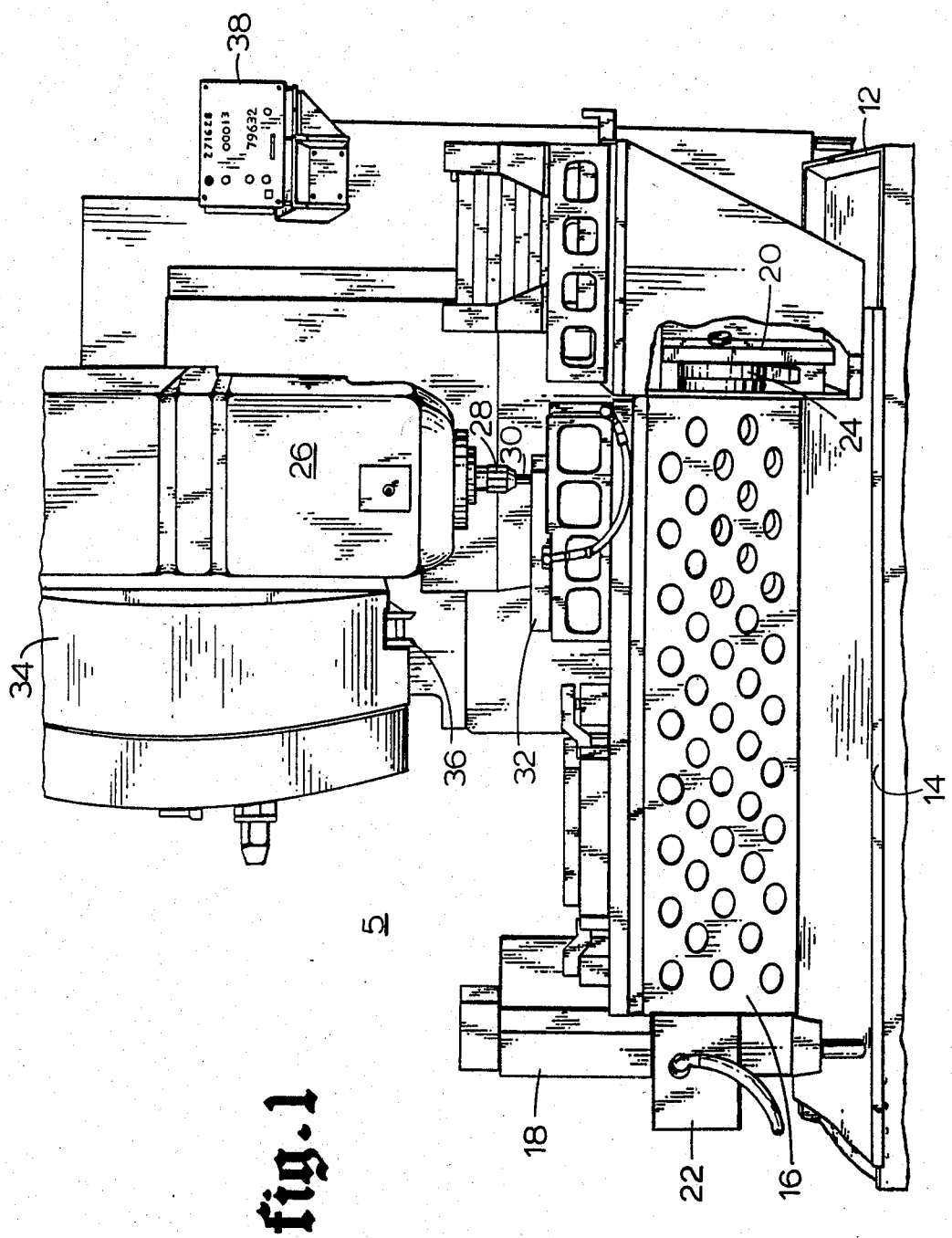
FIG. 1 is a perspective view of the automated machine tool incorporating the principles of this invention.

Referring to FIG. 1, there is shown an automated machining center 5. The automated machining center 5 is generally comprised of a frame 12 having mounted thereon a moveable bed 14 that is disposed to move longitudinally and latitudinally in a horizontal plane. Mounted on the moveable bed 14 is an elongated trunnion worktable 16 that is pivotally supported at each end by support structures 18 and 20 such that the worktable may be rotated about its horizontal axis by means of a drive motor 22. The trunnion worktable is extended to allow machining of large parts. A hydraulic brake 24 is mounted on a support 20 and actuated to apply friction braking to stop rotation of the trunnion worktable 16 at a desired position. Rotation of the trunnion worktable 16 about its horizontal axis allows precision angular cutting to be performed on a workpiece with respect to the vertical axis of a cutting tool. A workpiece 32 may be machined by rotation of the trunnion worktable 16 simultaneously with x-y movements of the table in its horizontal plane. A drive head indicated generally at 26 is mounted to the support frame 12 and is disposed to move in a vertical direction by means of a quill type shaft, not shown but well known in the art. Supported at the end of the drive head 26, is a spindle 28 that holds a machine cutting tool 30. The drive head 26 is disposed to rotate the spindle 28 and the cutting tool 30 at a fixed speed rate to cut and machine the workpiece 32 that is mounted to the worktable 16. A tool changing carrousel 34 is also supported on the support frame 12 in close proximity to the drill head 26 to store a multitude of different cutting tools that can be supported in the spindle 28 to perform different machine operations on the workpiece 32. When it is desired to change the cutting tool to perform a different machining operation, a tool changing arm 36 detaches the tool 30 from the spindle 28, returns the used tool to the tool changing carrousel 34, removes a new tool from the tool changing carrousel 34, and inserts it into the rotatable spindle 28 to perform a new machining operation.

The various automated machining functions and precise alignment of the automated machine tool 5 are controlled by a programmable control unit 38. The programmable control unit 38 may be a numerical control system with its program stored on a punch tape or other memory device. The programmable control unit 38 in addition to performing other functions that will be later described, controls the movement of the trunnion worktable 16 in a horizontal plane, the rotation of the trunnion worktable 16 about its horizontal axis, the speed rate of the rotatable spindle 28, and the automatic operation of the tool changing arm 36 to detach a used tool from the rotatable spindle 28 and exchange it with a tool stored in the tool changing carrousel 34.

Figure 2:
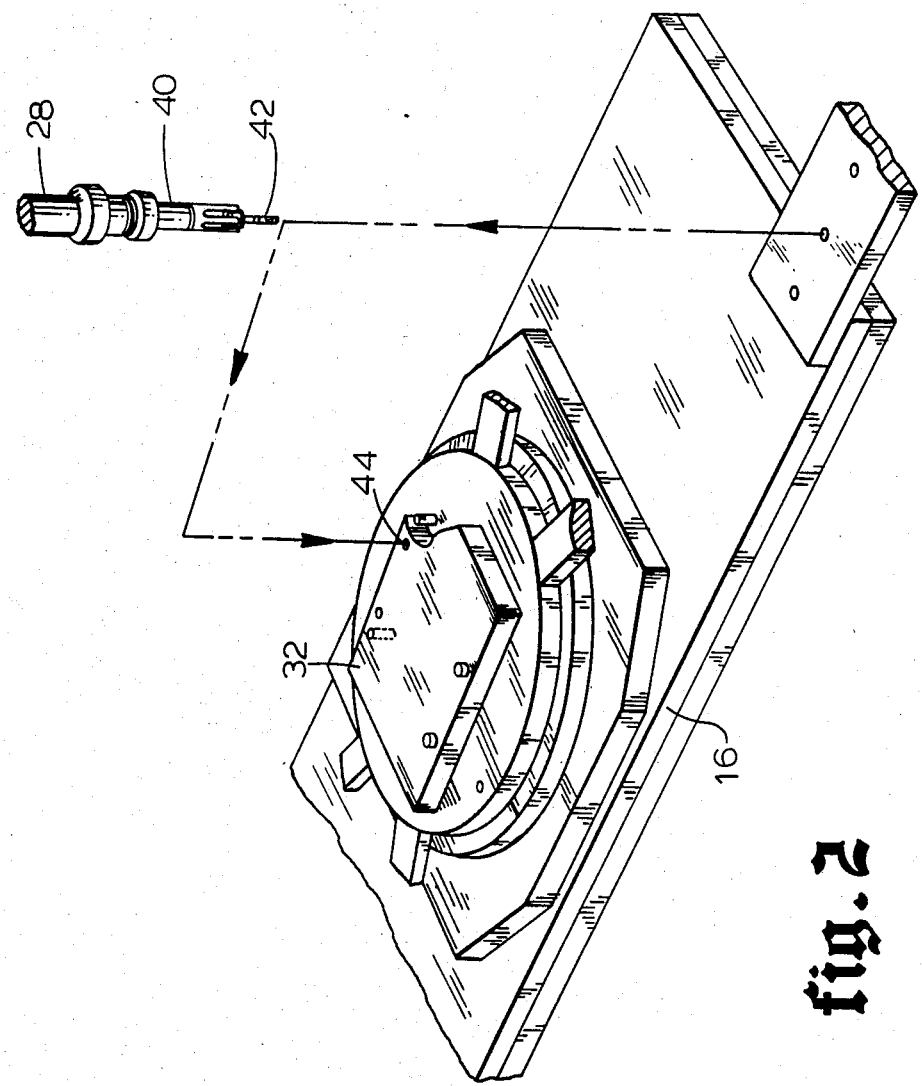
FIG. 2 is a perspective view of the adjustable torque driving tool incorporating the principles of this invention.

Referring to FIG. 2, there is shown an adjustable torque driving tool 40 designed to fit into the tool changing carrousel 34 and supported by the rotatable spindle 28. When the adjustable torque driving tool is retrieved from the tool changing carrousel 34 and attached to the rotatable spindle 28, under the control of the programmable control unit 38, the trunnion worktable 16 moves to a position where bolts 42 are stored on its surface and the adjustable torque driving tool 40 is lowered by the drive head 26 to grip the bolt 42 and then rotates the rotatable spindle 28 to remove the bolt 42 from the worktable. The trunnion worktable 16 then moves to a position where the axis of the bolt 42 held by the adjustably torque driving tool 40 is vertically aligned with previously drilled apertures 44 in the workpiece 32. The drill head then lowers the adjustable torque driving tool 40 to insert the bolt into the aperture 44 and the spindle 28 rotates the adjustable torque driver 42 tightening the bolt to secure the workpiece to the worktable for machining.

Figure 3:
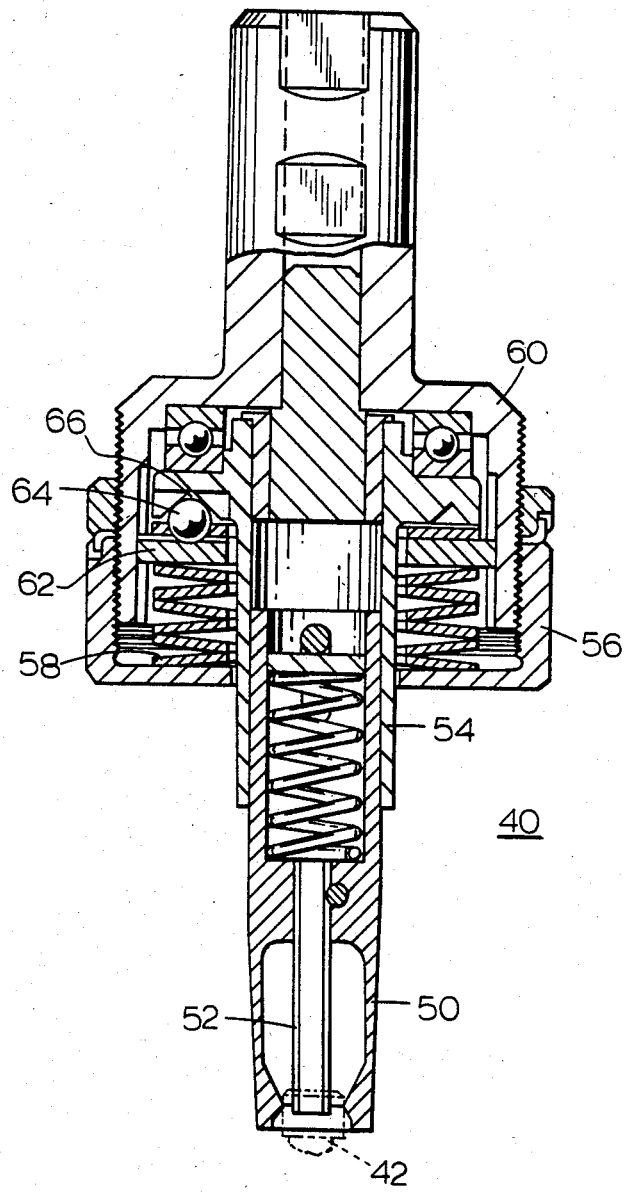
FIG. 3 is a sectional view of the adjustable torque driving tool.

Referring to FIG. 3, the adjustable torque driving tool 40 consist of a slotted steel sleeve 50 and a hexagonal drive bit 52 both of which are attached to an adjustable toque release assembly 54. The slotted steel sleeve is designed to grip a bolt head 42 which is disposed to receive the hexagonal drive bit 52. The torque is controlled by an adjustable sleeve 56 that compresses a spring 58 to bias the adjustable torque release assembly 54 into engagement with a tool head 60. The tool head 60 mounts in a rotatable spindle 28 and is rotated at a fixed speed rate. The biasing spring 58 exerts force on a retaining ring 62 which supports a bearing 64. The force of the spring 58 causes the bearing 64 to fit within a triangular-shaped groove 66 of the adjustable torque release assembly 54. The biasing of the bearing 64 within the groove 66 causes the adjustable torque release assembly 54 to rotate with the tool head 60. When the torque applied to the bolt exceeds the biasing of the spring 58, the spring is compressed by the adjustable torque release assembly 54 causing the bearing 64 to slip out of the groove 66 and disengage the assembly 54 from the tool head 60. The tool head 60 continues to rotate at the rotating spindle speed, however, additional torque is prevented from being applied to the bolt due to the slip of the adjustable torque release assembly 54. The bolts may be removed from the workpiece by reversing the drive action of the rotatable spindle 28.

Although there has been illustrated and described specific detail and structure of operation, it is clearly understood that the same were merely for purposes of illustration and that changes and modifications may be readily made therein by those skilled in the art without departing from the spirit and scope of this invention.

What we claim is:

1. An automatic machining center having an adjustable torque driving tool, comprising;
    (a) a frame;
    (b) a movable worktable means connected to the frame for supporting a workpiece and movable longitudinally and latitudinally to position the workpiece at a desired point in a horizontal plane;
    (c) a rotatable spindle means connected to the frame in a disposition of vertical movement thereon for supporting and rotating a cutting tool at a predetermined speed rate to machine the workpiece;
    (d) a tool changing means connected to the frame for storing cutting tools and exchanging the cutting tool supported in the rotatable spindle means with one of a multitude of different cutting tools stored therein;
    (e) an adjustable torque driving tool configured to be stored in the tool changing means and rotated by the rotatable spindle means such that the adjustable torque driving tool is released from the rotatable spindle means when a pre-selected torque is applied;
    (f) a programmable control means disposed to control the movable worktable means, the rotatable spindle means, the tool changing means, and the adjustable torque driving tool for automatic attachment and detachment of the workpiece from the movable worktable means during machining operations.

2. An automated machining center as recited in claim 1 wherein the adjustable torque driving tool drives bolts into the workpiece to secure the workpiece to the movable worktable means and removes the bolts to detach the workpiece from the movable worktable means after machining 3. An automated machining center as recited in claim 2 wherein the adjustable torque driving means is generally comprised of:
    (a) a tool head disposed to be supported and rotated by the rotatable spindle means;
    (b) an adjustable torque release assembly disposed to be connected to the tool head;
    (c) a drive bit means for supporting and driving a bolt or screw connected to the adjustable torque release assembly for rotation thereby; and
    (d) a biasing means for biasing the adjustable torque release assembly into engagement with the tool head to be driven thereby such that the adjustable torque release assembly is caused to slip and be released from the tool head when the torque applied to the bolt exceeds the force of the biasing means.

* * * * *

UNITED STATES PATENT OFFICE
CERTIFICATE OF CORRECTION

PATENT NO. : 4,574,463
DATED : 11 March 1986
INVENTOR(S) : Kenneth J. Palfery et al It is certified that error appears in the above-identified patent and that said Letters Patent are hereby corrected as shown below:

IN THE CLAIMS:

Col. 4, line 23, delete [cutting] (each occurrence)
      line 25, delete [cutting]

Col. 4, line 44, after "machining", insert .

Col. 4, line 48, delete [disposed] and substitute configured

Signed and Sealed this

Thirtieth Day of September 1986

[SEAL]

Attest:

DONALD J. QUIGG

Attesting Officer     Commissioner of Patents and Trademarks